US012697685B2

(12) United States Patent
Jeanrenaud et al.

(10) Patent No.: US 12,697,685 B2
(45) Date of Patent: Aug. 4, 2026

(54) METHOD FOR MANUFACTURING A CERAMIC-BASED EXTERNAL HOROLOGICAL OR JEWELLERY PART WITH PATTERNED DECORATION

(71) Applicant: Omega SA, Bienne (CH)

(72) Inventors: Frédéric Jeanrenaud, La Chaux-de-Fonds (CH); Gregory Kissling, La Neuveville (CH); Pierre Sauret, Les Hauts-Geneveys (CH)

(73) Assignee: Omega SA, Bienne (CH)

( * ) Notice: Subject to any disclaimer, the term of this patent is extended or adjusted under 35 U.S.C. 154(b) by 787 days.

(21) Appl. No.: 17/647,200

(22) Filed: Jan. 6, 2022

(65) Prior Publication Data

US 2022/0297235 A1 Sep. 22, 2022

(30) Foreign Application Priority Data

Mar. 19, 2021 (EP) ..................................... 21163722

(51) Int. Cl.
| | |
|---|---|
| *B23K 26/352* | (2014.01) |
| *B23K 26/00* | (2014.01) |
| *B23K 26/60* | (2014.01) |
| *B23K 103/00* | (2006.01) |
| *B41M 5/24* | (2006.01) |

(52) U.S. Cl.
CPC ........ *B23K 26/355* (2018.08); *B23K 26/0006* (2013.01); *B23K 26/60* (2015.10); *B41M 5/24* (2013.01); *B23K 2103/50* (2018.08)

(58) Field of Classification Search
CPC .. B23K 26/355; B23K 26/60; B23K 26/0006; B23K 2103/50; B41M 5/24
See application file for complete search history.

(56) References Cited

U.S. PATENT DOCUMENTS

| | | | |
|---|---|---|---|
| 8,685,185 B2 | 4/2014 | Guo et al. | |
| 2008/0299408 A1* | 12/2008 | Guo ......................... | C22F 3/00 |
| | | | 219/121.72 |
| 2012/0067855 A1 | 3/2012 | Guo et al. | |

(Continued)

FOREIGN PATENT DOCUMENTS

| | | |
|---|---|---|
| CN | 101310225 A | 11/2008 |
| CN | 201796234 U | 4/2011 |

(Continued)

OTHER PUBLICATIONS

Japanese Office Action issued Jan. 31, 2023 in Japanese Application 2022-003533 (with English Translation), citing documents 15-20 therein, 8 pages.

(Continued)

*Primary Examiner* — Edward F Landrum
*Assistant Examiner* — Theodore J Evangelista
(74) *Attorney, Agent, or Firm* — Oblon, McClelland, Maier & Neustadt, L.L.P.

(57) ABSTRACT

A method for manufacturing an external horological or jewellery part including the following successive steps of producing a base plate in a substrate made of a ceramic material, mirror polishing the base plate on at least one face, referred to as the "display face", intended to be visible to a user, laser machining according to predefined patterns in a preliminary step, oxidising the base plate by heat treatment.

5 Claims, 1 Drawing Sheet

(56) References Cited

U.S. PATENT DOCUMENTS

| | | | |
|---|---|---|---|
| 2014/0154526 A1 | 6/2014 | Guo et al. | |
| 2014/0363608 A1 | 12/2014 | Russell-Clarke et al. | |
| 2015/0049593 A1* | 2/2015 | Oliveira | B23K 26/06 |
| | | | 219/121.69 |
| 2015/0092524 A1 | 4/2015 | Verdon | |
| 2016/0263698 A1* | 9/2016 | Noirot | B23K 26/359 |
| 2017/0100797 A1 | 4/2017 | Guo et al. | |
| 2020/0269356 A1 | 8/2020 | Netuschill et al. | |
| 2020/0293001 A1 | 9/2020 | Jeanrenaud et al. | |

FOREIGN PATENT DOCUMENTS

| | | | | |
|---|---|---|---|---|
| CN | 103025475 A | | 4/2013 | |
| CN | 103302400 A | | 9/2013 | |
| CN | 110102904 A | | 8/2019 | |
| CN | 111610708 A | | 9/2020 | |
| EP | 0453382 A1 | * | 10/1991 | |
| EP | 3591099 A1 | * | 1/2020 | C04B 41/009 |
| EP | 3 699 695 A1 | | 8/2020 | |
| FR | 2771325 A1 | * | 5/1999 | B23Q 35/128 |
| JP | 50-79470 U | | 7/1975 | |
| JP | 2005-261675 A | | 9/2005 | |
| JP | 2006-327897 A | | 12/2006 | |
| JP | 2015-72270 A | | 4/2015 | |
| JP | 2016-183961 A | | 10/2016 | |
| JP | 2020-148765 A | | 9/2020 | |
| KR | 10-0634064 B1 | | 10/2006 | |
| KR | 10-2013-0052099 A | | 5/2013 | |

OTHER PUBLICATIONS

Korean Notice of Grounds for Rejection issued Feb. 20, 2024 in Korean Patent Application No. 10-2022-0018382 (with English Translation), citing reference 15 therein, 12 pages.

Combined Chinese Office Action and Search Report issued Feb. 9, 2024, in corresponding Chinese Patent Application No. 202210269367.8 (with English Translation of Category of Cited Documents) citing documents 1, 15-18 therein, 7 pages.

European Search Report issued Sep. 1, 2021 in European Application 21163722.8, filed on Mar. 19, 2021 citing documents AA- AF and AO- AP therein, 3 pages (with English Translation of Categories of cited documents).

Combined Chinese Office Action and Search Report issued Nov. 4, 2024, in corresponding Chinese Patent Application No. 202210269367.8 (with English Translation of Category of Cited Documents) citing documents 15-16 therein, 9 pages.

\* cited by examiner

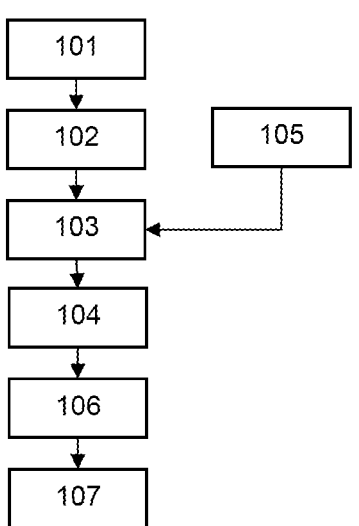

METHOD FOR MANUFACTURING A CERAMIC-BASED EXTERNAL HOROLOGICAL OR JEWELLERY PART WITH PATTERNED DECORATION

CROSS-REFERENCE TO RELATED APPLICATION

This application claims priority to European Patent Application No. 21163722.8 filed on Mar. 19, 2021, the entire disclosure of which is hereby incorporated herein by reference.

TECHNICAL FIELD OF THE INVENTION

The invention relates to the horology or jewellery field, and more particularly relates to a method for manufacturing a ceramic-based external horological or jewellery part with patterned decoration. The invention further relates to a dial of a timepiece manufactured by implementing said method.

TECHNOLOGICAL BACKGROUND

Several methods known in the prior art exist for procuring a specific visual appearance, for example a frosted appearance, for an external horological or jewellery part.

More specifically, the deposition of a varnish or an organic lacquer, the composition whereof gives the external part a metallic appearance is known.

Use of a mineral material of the opal or quartz type as a substrate for the external part is also known.

Moreover, another method is known to comprise a first step wherein the surface of an external part is patterned or grained, by stamping or using a laser. The external part is made of a metal, for example aluminium or a copper alloy.

The surface is then polished and coated with a layer of a white material, for example silver, by electroplating or by vacuum thin film deposition, for example of the physical vapour deposition (PVD) or atomic layer deposition (ALD) type.

However, the implementation of these methods is not entirely satisfactory, insofar as they do not allow certain aesthetic features to be obtained, in particular a metallic sheen, i.e. high reflectivity, or high colour intensity, etc.

SUMMARY OF THE INVENTION

The invention overcomes the aforementioned drawbacks by offering a solution that makes it possible to produce an external part with a high degree of brilliance and shine, and in particular a particularly intense and pronounced frosted aesthetic appearance.

For this purpose, the present invention relates to a method for manufacturing an external horological or jewellery part comprising the following successive steps of:

- producing a base plate in a substrate made of a ceramic material,
- mirror polishing the base plate on at least one face, referred to as the "display face", intended to be visible to a user,
- laser machining predefined patterns in a preliminary step on the display face,
- oxidising the base plate by heat treatment.

Advantageously, the patterns visually appear, on the one hand, thanks to the mechanical patterning of the surface carried out in the laser machining step, and on the other hand, thanks to the difference in surface finish between said patterns, which have a matt appearance, and the rest of the display surface, which has a shiny appearance.

The mechanical patterning of the display surface thus makes it possible, by modifying the diffraction of light, to generate optical effects reinforcing the frosted appearance of said surface.

In specific implementations, the invention can further include one or more of the following features, which must be considered singly or according to any combinations technically possible.

In specific implementations, the base plate is made of a zirconium oxide substrate.

In specific implementations, the base plate is made of glass, stone, alumina or sapphire.

In specific implementations, the base plate is produced such that it has a thickness comprised between 0.1 mm and 1.2 mm, preferably a thickness of 0.4 mm.

In specific implementations, in the preliminary step, the predefined patterns are obtained by digital image processing, so as to obtain an image formed of black pixels and white pixels, said black pixels or white pixels representing the patterns to be machined.

In specific implementations, in the preliminary step, the image obtained is formed of black pixels, white pixels, and greyscale pixels, said black, white or greyscale pixels representing the patterns to be machined.

In specific implementations, the shade of grey of the pixels is representative of the depth of machining. In other words, the shade of grey of each greyscale pixel is representative of the depth of machining of the area of the pattern corresponding to each of said pixels.

In specific implementations, the graphic content of the digital image includes a dendritic shape, such that the patterns machined on the base plate give the base plate a dendritic appearance.

In specific implementations, the surface area of the patterns represents between 25% and 75% of the display area.

In specific implementations, the patterns have a depth comprised between 200 nm and 50 μm, preferably between 5 μm and 10 μm.

In specific implementations, in the step of oxidising the base plate, the heat treatment is carried out at a temperature comprised between 500 and 1,000 degrees Celsius.

In specific implementations, a step of depositing a thin layer on a face of the base plate opposite the display face, referred to as the "bottom face", is carried out after the oxidation step.

In specific implementations, the step of depositing a thin layer on the bottom face consists of applying a varnish.

In specific implementations, a step of depositing a transparent or semi-transparent thin layer on the display face is carried out after the oxidation step.

According to another aspect, the present invention further relates to a dial for a timepiece, such as a watch, obtained by implementing a manufacturing method as described hereinabove.

BRIEF DESCRIPTION OF THE FIGURES

Other features and advantages of the invention will be better understood upon reading the following detailed description, which is given as a rough guide and in no way as a limiting guide, with reference to the accompanying drawings, in which:

FIG. 1 shows a flow chart illustrating the steps of a method for manufacturing an external horological or jewellery part according to the invention.

DETAILED DESCRIPTION OF THE INVENTION

The present invention relates to a method for manufacturing an external horological or jewellery part, the steps whereof are diagrammatically illustrated by the flow chart in FIG. 1.

The method according to the invention comprises the successive steps of:

producing 101 a base plate in a substrate made of a ceramic material, mirror polishing 102 the base plate on at least one face, referred to as the "display face", intended to be visible to a user, laser machining 103 predefined patterns in a preliminary step 105 on the display face, oxidising 104 the base plate by heat treatment.

The steps of the manufacturing method are described in detail hereinbelow.

The base plate is preferably made of a zirconium oxide substrate. This material advantageously has optical and mechanical features that are suitable for forming the base plate, as well as being relatively easy to work with.

Alternatively, the substrate can be made of any ceramic material, such as glass, stone, alumina, or sapphire, etc.

Preferably, the substrate has a single colour, for example white.

The base plate is produced such that it has a thickness comprised between 0.1 mm and 1.2 mm, preferably a thickness of 0.4 mm.

The mirror polishing step 102 for the display face of the base plate gives said display face a shiny appearance with a high reflective power.

The machining step 103 is preferably carried out by nanosecond, picosecond or femtosecond laser engraving. The machining step generally refers to any material removal operation, such as engraving or marking.

In the machining step 103, laser engraving is carried out by a laser machining device controlled to machine patterns on the surface of the display face.

These patterns are defined after processing a predetermined digital image in the preliminary step 105. More precisely, the processing of the predetermined digital image consists of obtaining, by means of an image processing algorithm, a transformed digital image comprising a set of black pixels and of white pixels representative in particular of the brightness and contrast of the predetermined digital image.

More specifically, the black pixels correspond to the darkest pixels of the predetermined digital image, i.e. those whose brightness is below a predefined threshold, and the white pixels correspond to the lightest pixels of the predetermined digital image, i.e. those whose brightness is above the predefined threshold.

The black pixels or white pixels represent the patterns to be machined.

Patterns representative of the graphic content, i.e. the visual appearance, of one or more predetermined digital images can thus be machined on the base plate.

In another example implementation of the present invention, in the preliminary step 105, the image obtained is formed, in addition to black pixels and white pixels, of greyscale pixels. Similarly to the black and white pixels, the shade of grey of each greyscale pixel corresponds to the brightness of the corresponding pixel.

The shade of grey of each greyscale pixel is representative of the depth of machining of the area of the pattern corresponding to each of said pixels.

Preferably, in the method according to the invention, the graphic content of the digital image includes a dendritic shape, such that the patterns machined on the base plate give the display face a dendritic appearance.

The patterns can be arranged randomly on the surface of the display face or in predefined areas.

Advantageously, the surface area of the patterns represents between 25% and 75% of the display area, preferably between 40% and 60%. The dendritic appearance of the display face is thus enhanced.

In the machining step 103, the patterns are machined to a depth comprised between 200 nm and 50 μm, preferably between 5 μm and 10 μm.

This depth determines the degree of visibility of the patterns. In other words, the deeper the patterns are machined, the more visible they are.

Laser machining produces a local sublimation of the substrate material at the machined pattern and consequently produces heating which causes a change in colour.

Step 104 of oxidising the base plate by heat treatment advantageously allows the base plate to recover its initial colour.

Preferably, during this step 104 of oxidising the base plate, the heat treatment is carried out at a temperature comprised between 500 and 1,000 degrees Celsius.

Thanks to the steps of the manufacturing method according to the present invention, the external part obtained advantageously has a high degree of brilliance and shine.

Moreover, since the machined patterns have a matt appearance and the rest of the display surface has a shiny appearance, the display face generates an optical effect which, in combination with the dendritic appearance of the patterns, helps to enhance the frosted appearance.

Preferably, a step 106 of depositing a thin layer on a face of the base plate opposite the display face, referred to as the "bottom face", can be carried out after the oxidation step 104.

This step results in the opacification of the substrate and potentially increases the mechanical features of the external part, for example in the case where the thickness of the base plate is particularly small.

More particularly, the step 106 of depositing a thin layer on the bottom face consists of applying a varnish.

Furthermore, a step 107 of depositing a thin layer on the display face can be carried out after the oxidation step 104, said thin layer being transparent or semi-transparent.

This thin layer thus has the effect of protecting the base plate from any chemical or mechanical attack and potentially changing the colour thereof.

This deposition step 107 can consist of the application of a thin layer by physical vapour deposition (PVD).

Alternatively, this deposition step 107 can consist of the application of a varnish or a lacquer, that is for example patterned.

It should be noted that the deposition steps 106 and 107 are independent of one another in the sense that one can be carried out without the other being carried out, and the order in which these steps are carried out is of no importance, even though the flow chart in FIG. 1 shows the deposition step 106 being carried out before the deposition step 107 is carried out.

In a preferred application, the external horological or jewellery part manufactured by implementing the method according to the invention is a dial of a timepiece, such as a watch.

More generally, the external part manufactured by the method according to the invention can be formed by any decorative item in the horology or jewellery fields that is intended to be visible to a user.

The invention claimed is:

1. A method for manufacturing a dial of a timepiece, the method consisting of, in order, steps of:

producing a base plate in a substrate made of a ceramic material, the base plate having a thickness between 0.1 mm and 1.2 mm, directly after producing the base plate, mirror polishing the base plate on a display face of the dial to be visible to a user such that the base plate has a shiny appearance, directly after the mirror-polishing step, laser machining predefined patterns having a matte appearance on the mirror-polished display face, wherein a surface area of the patterns represents between 40% and 60% of a surface area of the display face and the patterns have a depth between 5 µm and 10 µm, directly after the laser-machining step, oxidizing, by heat treatment, the laser-machined, mirror-polished base plate at a temperature between 500 and 1,000 degrees Celsius;

depositing a transparent or semi-transparent thin layer on the display face, after the oxidizing step; and depositing a thin layer on a bottom face of the base plate opposite the display face, after the oxidation step, to opacify the substrate, wherein, in the machining step, the predefined patterns are obtained by digital image processing, so as to obtain a digital image formed of black pixels and white pixels, said black pixels or white pixels representing the predefined patterns, wherein a graphic content of the digital image includes a dendritic shape, such that the patterns machined on the base plate give the base plate a frosted appearance.

2. The manufacturing method according to claim 1, wherein the base plate is made of a zirconium oxide substrate.

3. The manufacturing method according to claim 1, wherein the base plate is made of glass, stone, alumina, or sapphire.

4. The manufacturing method according to claim 1, wherein, in the machining step, the image obtained is formed of black pixels, white pixels, and greyscale pixels, said black, white, and greyscale pixels representing the predefined patterns.

5. The manufacturing method according to claim 4, wherein a shade of grey of the pixels is representative of the depth of machining.

\* \* \* \* \*